United States Patent [19]

Ostrovsky

[11] Patent Number: 4,480,635
[45] Date of Patent: Nov. 6, 1984

[54] SOLAR HEATER

[75] Inventor: Izhar Ostrovsky, Kfar-Saba, Israel

[73] Assignee: Rav Shemesh B.M., Haifa, Israel

[21] Appl. No.: 464,016

[22] Filed: Feb. 4, 1983

Related U.S. Application Data

[63] Continuation of Ser. No. 260,780, May 5, 1981, abandoned.

[30] Foreign Application Priority Data

May 8, 1980 [IL] Israel .......................................... 60024

[51] Int. Cl.³ ............................ F24J 3/02; F24H 0/00
[52] U.S. Cl. ...................................... 126/445; 165/56; 165/46
[58] Field of Search ................ 126/444, 445; 165/46, 165/56; 156/292

[56] References Cited

U.S. PATENT DOCUMENTS

| 2,448,648 | 9/1948 | Zideck | 126/444 |
| 2,748,404 | 6/1956 | Winstead | 156/292 |
| 4,062,351 | 12/1977 | Hastwell | 126/445 |
| 4,206,748 | 6/1980 | Goodman | 126/444 |

Primary Examiner—Samuel Scott
Assistant Examiner—G. Anderson
Attorney, Agent, or Firm—Bergman, Aisenberg & Platt

[57] ABSTRACT

The present invention relates to a solar heater for heating water comprising two sheets of blackened materials constituting one unit connected to each other by partition walls constituting longitudinal channels for the water to be heated and at both sides manifolds suitably closed at their ends having an inlet or outlet for the cold and hot water, respectively. The invention relates also to a method for the preparation of said solar heater.

5 Claims, 7 Drawing Figures

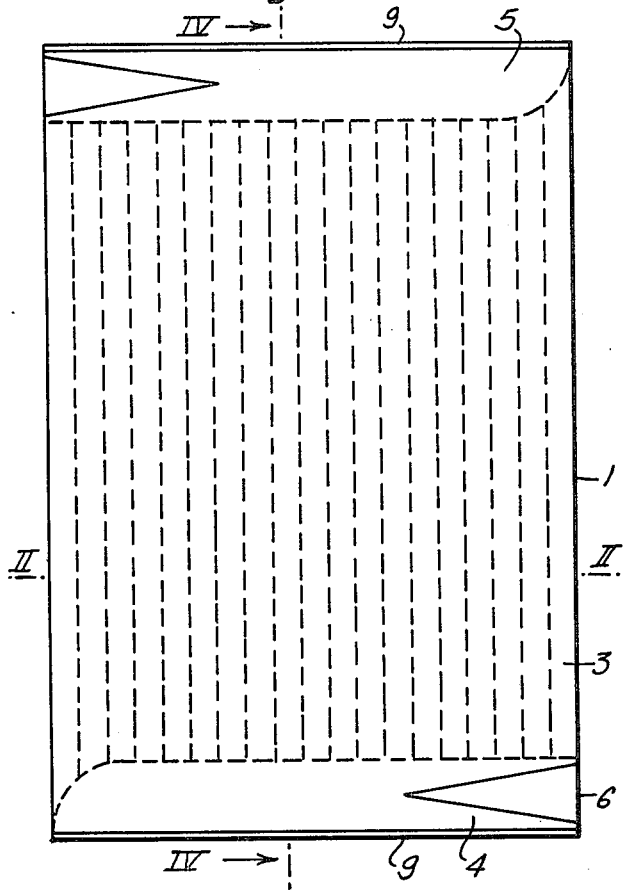
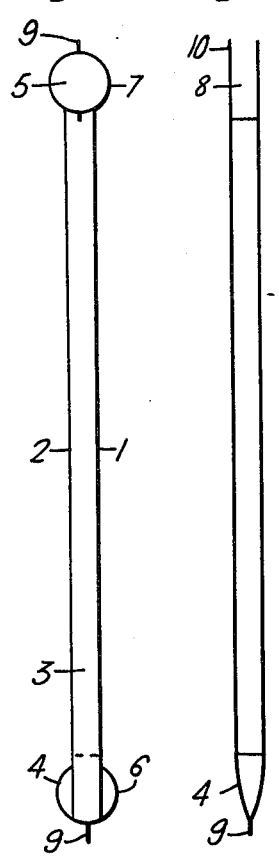
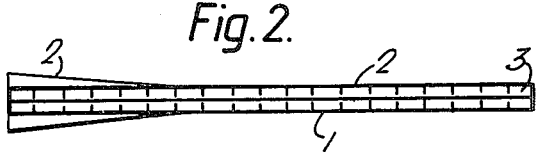

SOLAR HEATER

This is a continuation of application Ser. No. 260,780 filed May 5, 1981 now abandoned.

The present invention relates to a solar heater.

There are known quite a lot of solar heaters each of which having its advantages and disadvantages. Some of them are quite difficult to manufacture while others do not sufficiently exploit the sun's rays.

It has therefore been desirable to devise a solar heater and in particular a process for the manufacture thereof which would overcome the disadvantages of the known solar heater and retain the advantages of same.

The present invention thus consists in a solar heater for heating water comprising two sheets of blackened material constituting one unit connected to each other by partition walls constituting longitudinal channels for the water to be heated and at both sides manifolds suitably closed at their ends having an inlet or outlet for the cold and hot water, respectively.

A manifold in connection with the present invention means a channel from which all the longitudinal channels start or into which all terminate, respectively, being closed at all ends besides having one opening serving as inlet or outlet respectively.

The material of which the solar heater is produced may be made of any suitable material. There should be mentioned, for example, certain polyethylenes such as high density, high molecular Lupolon 5261/Z of BASF; certain polypropylenes, e.g., Propethane PP52 of ICI; and certain polycarbonates, e.g., Qualex of Qualex Co. Ltd.

The above materials are blackened by methods known per se, e.g., by coating with carbon black. This may be done before, in the course of or even after the forming of the solar heater.

Advantageously the solar heater, according to the present invention is, besides the side pointing towards the sun, surrounded by suitable insulating material, e.g. glass wool, foamed polyurethane, etc.

The present invention also consists in a process for the manufacture of the solar heater according to the present invention which comprises the following steps:
 a. extruding as one unit the two sheets made of the blackened material connected to each other by partition walls;
 b. cutting at both ends the partition walls up to a certain distance thereby obtaining two unconnected sheets; and
 c. welding the edges of said sheets together in such a manner forming the manifolds (as herein defined) having an inlet or outlet, respectively.

In some cases it might be desirable to file off at the open ends the partition walls which operation may facilitate the welding process.

The place of the inlet or outlet at the manifold may be chosen in accordance with the requirements of the customer. It may be at the ends or even within one of the sheets.

In case that the inlet and/or outlet are within the sheet, the appropriate hole is being made before or after the welding operation.

The solar heater according to the present invention operates as follows:

Cold water is introduced through the inlet to a manifold. The water flows through the channels formed by the partition walls. While the water flows inside said channels the water is heated to the desired degree. It reaches the other manifolds and leaves through the outlet.

It is readily understood that the dimensions of this solar heater according to the present invention are not critical. They may be varied according to the requirements of the constructor and/or the customer. The thickness of each sheet is advantageously 0.7-1.2 mm.

The welding can be performed in manners known per se. The specific conditions depend on the thickness of the sheets and on the material from which it is made.

The present invention will now be illustrated with reference to the accompanying drawings without being restricted by them. In said drawings:

FIG. 1 shows a top view, partially in section of a solar heater according to the present invention;

FIG. 2 shows a section along line II—II of FIG. 1;

FIG. 3 shows a side view of the solar heater shown in FIG. 1;

FIG. 4 shows a section along line IV—IV of FIG. 1 in which one manifold is closed and one is not yet welded;

Figure 5:
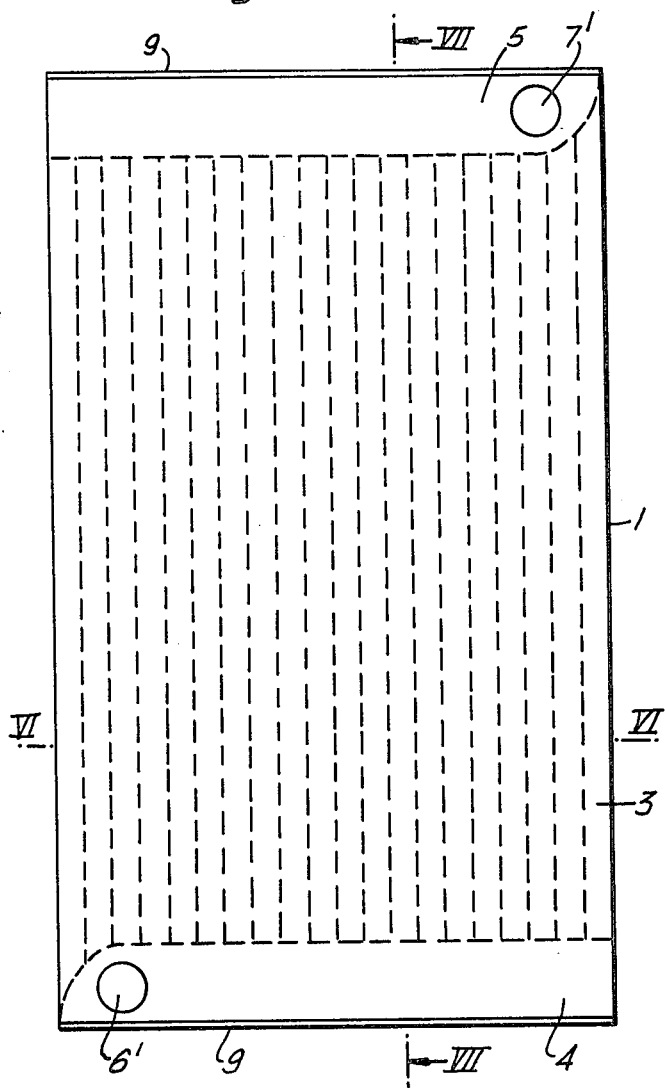
FIG. 5 shows a top view partially in section of another embodiment of a solar heater according to the present invention.

The solar heater as illustrated in FIGS. 1-4 comprises a unit consisting of bottom sheet 1 and upper sheet 2, the partition walls 3, manifolds 4 and 5, and inlet 6 and outlet 7.

Said solar heater is manufactured as follows:

A unit consisting of blackened sheets 1 and 2 and partition walls 3 is obtained by extrusion. Thereafter partition walls 3 are cut in such a manner as becomes clear from FIG. 4 at point 8. Thereafter partition walls 3 are filed off in the area of the disconnected sheets (point 8) and finally edges 10 and 11 of sheets 1 and 2 are welded together forming seal 9, leaving inlet and outlet 6 and 7 open.

Figure 6:
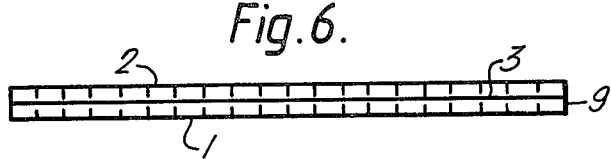
FIG. 6 shows a section along line VI—VI of FIG. 5.
Figure 7:
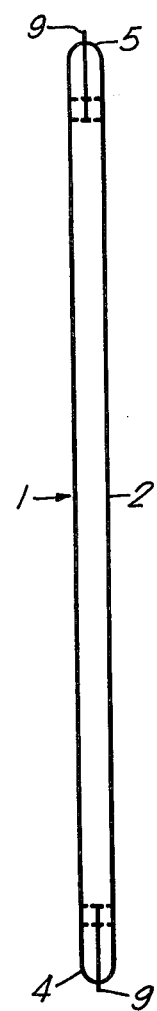
FIG. 7 shows a section along line VII—VII of FIG. 5.

The embodiment illustrated in FIGS. 5 to 7 is identical to the first embodiment, with the exception that inlet 6' and outlet 7' are arranged in sheet 2 and manifolds 4 and 5 are closed at the edges.

The solar heaters illustrated in FIGS. 1 to 7 are made from Lupolon 5261/Z of BASF. The thickness of the sheets was about 1 mm. The welding was performed with a welding machine adapted to the above material and size.

I claim:

1. A solar panel for absorbing solar energy and for transmitting the energy to a medium comprising two substantially continuous sheets, each of said sheets having a plurality of partition walls integral therewith, said partition walls on one of said sheets being aligned with said partition walls on the other of said sheets to form a plurality of channels adapted to carry said medium, and inlet and outlet manifolds for communicating with said channels, each manifold consisting of a chamber formed by removing portions of said partition walls and sealing edges of said two sheets together, and means for allowing said medium to flow into said inlet manifold and out of said outlet manifold, whereby each manifold is bounded at opposed ends by side portions of said sheets and along one side by said edges which have been sealed together.

2. A solar heater according to claim 1 wherein said sheets and said partition walls are of polyethylene.

3. A solar heater according to claim 2 wherein said polyethylene is a high molecular polyethylene.

4. A solar heater according to claim 1 wherein said sheets and said walls are of polypropylene.

5. A solar heater according to claim 1 wherein said sheets and said partition walls are of polycarbonate.

* * * * *